United States Patent
Wang et al.

(10) Patent No.: US 8,831,588 B2
(45) Date of Patent: Sep. 9, 2014

(54) DATA TRANSMISSION ADJUSTMENT SYSTEM AND DATA TRANSMISSION ADJUSTMENT METHOD

(75) Inventors: Ting-Yu Wang, Taipei (TW); Phone Lin, Taipei (TW); Huai-Lei Fu, Taipei (TW)

(73) Assignee: National Taiwan University, Taipei (TW)

( * ) Notice: Subject to any disclaimer, the term of this patent is extended or adjusted under 35 U.S.C. 154(b) by 188 days.

(21) Appl. No.: 13/436,410

(22) Filed: Mar. 30, 2012

(65) Prior Publication Data

US 2012/0190357 A1 Jul. 26, 2012

Related U.S. Application Data (63) Continuation-in-part of application No. 12/489,686, filed on Jun. 23, 2009, now abandoned.

(51) Int. Cl.
*H04W 4/00* (2009.01)
*H04L 29/08* (2006.01)

(52) U.S. Cl.
CPC .................................... *H04L 67/12* (2013.01); *H04L 67/32* (2013.01)
USPC ...................... 455/422.1; 370/280; 370/395.4; 370/458; 370/468; 455/11.1; 455/155.1; 455/158.3

(58) Field of Classification Search
USPC .............. 370/395.4, 431, 442, 445, 447, 280, 370/310, 329, 330, 335, 336, 338, 458, 46; 455/9, 11.1, 13.4, 16, 41.1, 41.2, 455/151.4, 155.1, 158.3, 422.1, 466, 507, 455/512, 517
See application file for complete search history.

(56) References Cited

U.S. PATENT DOCUMENTS

| | | | |
|---|---|---|---|
| 6,112,058 A | 8/2000 | Walters | |
| 2006/0087993 A1* | 4/2006 | Sengupta et al. | 370/310 |
| 2006/0140208 A1 | 6/2006 | Couch et al. | |
| 2006/0145815 A1* | 7/2006 | Lanzieri et al. | 340/10.2 |
| 2006/0268792 A1 | 11/2006 | Belcea | |
| 2010/0008272 A1* | 1/2010 | Messinger et al. | 370/311 |

FOREIGN PATENT DOCUMENTS

| | | |
|---|---|---|
| TW | 421934 | 2/2001 |
| TW | 475321 | 2/2002 |
| TW | I295041 | 3/2008 |
| TW | I300913 | 9/2008 |
| TW | 200839664 | 10/2008 |

OTHER PUBLICATIONS

Xu et al., "Adaptive Energy-Conserving Routing for Multihop Ad Hoc Networks," USC/ISI Research Report 527, Oct 12, 2000, pp. 1-14.

* cited by examiner

*Primary Examiner* — Dinh P Nguyen
(74) *Attorney, Agent, or Firm* — Muncy, Geissler, Olds & Lowe, P.C.

(57) ABSTRACT

An data transmission adjustment system that comprises a server and a plurality of data transmission devices within a sensing region. The server adapts to receive a sensed data from at least one data transmission device, define a timeline, divide the timeline into a plurality of monitoring periods, calculate a ratio of the number of the monitoring periods that have received the sensing data from the data transmission device within the sensing region or not to the number of all the monitoring periods, and broadcast at least one message to the data transmission devices within the sensing region according to said ratio.

27 Claims, 8 Drawing Sheets

DATA TRANSMISSION ADJUSTMENT SYSTEM AND DATA TRANSMISSION ADJUSTMENT METHOD

REFERENCE TO RELATED APPLICATION

This Application is a Continuation-in-Part of patent application Ser. No. 12/489,686, now abandoned filed on 23 Jun. 2009.

BACKGROUND OF THE INVENTION

1. Technical Field

The present invention is related to a reporting method for a data transmission device, wherein only one data transmission device transmits sensed data at a time in a sensing region.

2. Description of the Prior Art

Figure 1:
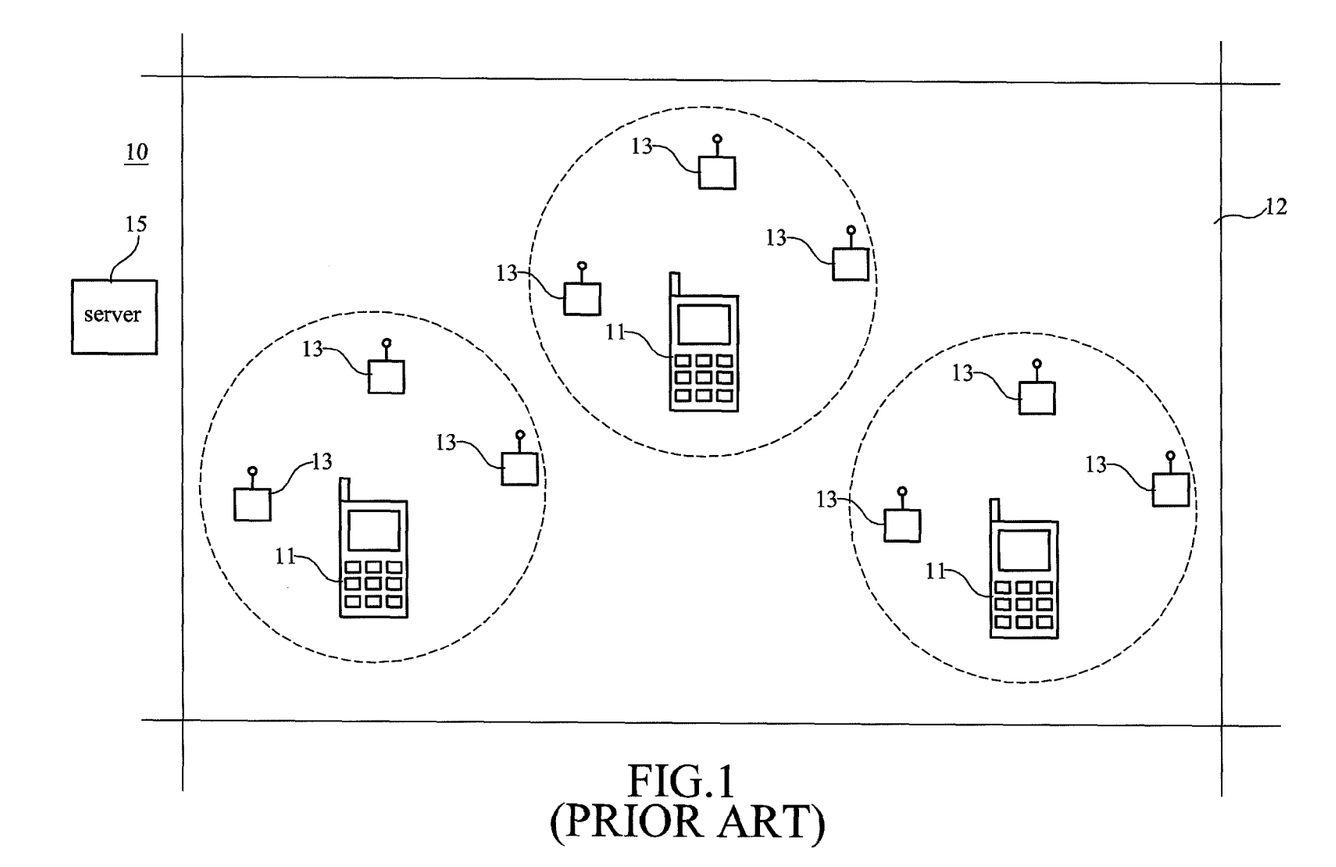
FIG. 1 is a diagram of the sensed data transmission system according to the prior art.

Referring to FIG. 1, what is shown is a diagram of the sensed data transmission system according to the prior art. The data transmission system 10 comprises a plurality of mobile phones 11, and a plurality of sensor devices 13, wherein the mobile phones 11 and the sensor devices 13 are located in the same sensing region 12.

The sensor devices 13 can be used to sense environmental information and transmit sensed data to the mobile phones 11. As the mobile phone 11 receives the sensed data from the sensor device 13, the mobile phone 11 can transmit the sensed data to a server 15. Therefore, the server 15 accomplishes the collection of the sensed data in the sensing region 12.

As there is a plurality of mobile phones 11 in the sensing region 12, all the mobile phones 11 may transmit the sensed data to the server 15 at the same time or within the same time slot. However, it is not necessary for all mobile phones 11 to transmit the sensed data at the same time because of the high similarity of the sensed data. If there are many mobile phones 11 transmitting the sensed data to the server 15 at the same time, it not only causes redundancy for the data transmission system 10, but also the energy consumption of the mobile phone 11.

SUMMARY OF THE INVENTION

It is a primary objective of the present invention to provide a reporting method for a data transmission device, wherein there is a plurality of data transmission devices in a sensing region, and where only one data transmission device enters the reporting state for transmitting sensed data to a server at a time.

It is a secondary objective of the present invention to provide a reporting method for a data transmission device, wherein the data transmission devices in the sensing region can enter a sleeping state, which in turn reduces the energy consumption of the data transmission device.

It is another objective of the present invention to provide a reporting method for a data transmission device, wherein the data transmission device can broadcast a message to other data transmission devices in the sensing region, while the data transmission device transmits the sensed data to a server.

It is still another objective of the present invention to provide a reporting method for a data transmission device, wherein each data transmission device enters the reporting state from the listening state after different time slot, such that the data transmission devices in the same sensing region may not transmit the same or similar sensed data to the server at the same time.

To achieve the previous mentioned objects, the present invention provides a data transmission adjustment system, comprising: a plurality of data transmission device within a sensing region; and a server receiving a sensed data from at least one the data transmission device, wherein the server adapt to define a timeline, divide the timeline into a plurality of monitoring periods, calculate a ratio of the number of the monitoring periods that have received the sensing data from the data transmission device within the sensing region or not to the number of all the monitoring periods, and broadcast at least one message to the data transmission devices within the sensing region according to the ratio.

Further, the present invention provides a data transmission adjustment method for a server, wherein the server receives at least one sensing data from at least one data transmission device within a sensing region, the data transmission adjustment method comprising the steps of defining a timeline; dividing the timeline into a plurality of monitoring periods; calculating a ratio of the number of the monitoring periods that have received the sensing data from the data transmission device within the sensing region or not to the number of all the monitoring periods; and broadcasting at least one message to the data transmission devices within the sensing region according to the ratio.

The present invention can be best understood through the following description and accompanying drawings.

DETAILED DESCRIPTION OF THE PREFERRED EMBODIMENTS

Figure 2:
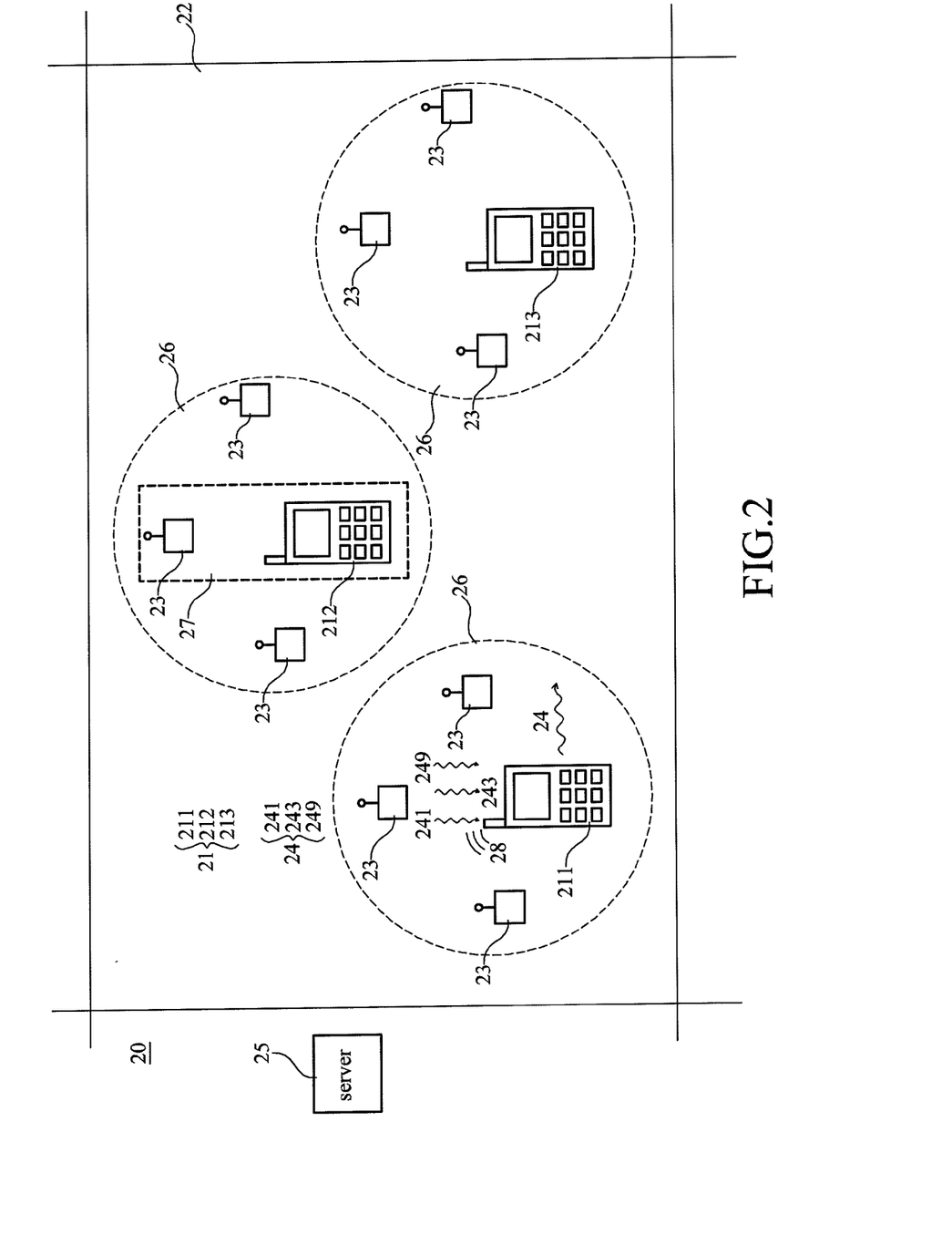
FIG. 2 is a schematic diagram of the sensed data transmission system according to an embodiment of the present invention.

Referring to FIG. 2, a schematic diagram of the sensed data transmission system according to an embodiment of the present invention is disclosed. The data transmission system 20 comprises at least one data transmission device 21, and at least one sensor device 23, wherein the data transmission device 21 and the sensor devices 23 are located in a sensing region 22.

The sensor device 23 can be used to monitor the environmental information, such as temperature, humidity, traffic, and so on, for generating a sensed data 24. Furthermore, the data transmission device 21 can receive the sensed data 24 from the sensor device 23 via a transmission line. In another embodiment of the invention, the sensed data 24 can be transmitted from the sensor device 23 to the data transmission device 21 in a transmission region 26 via a short-range wireless technology, such as zigbee, RFID, Bluetooth and so on.

The data transmission device 21 can transmit the sensed data 24 that is transmitted from the sensor device 23 to a server 25. In another embodiment of the invention, the sensed data 24 can be transmitted from the data transmission device 21 to the server 25 via a wireless technology, such as GSM, UMTS, EPS, WiMAX and so on. The data transmission device 21 also broadcasts a message 28, as it transmits the sensed data 24 to the server 25, so that the other data transmission device 21 in the same sensing region 22 can receive the same message 28.

In one embodiment of the invention, the data transmission device 21 comprises a first data transmission device 211, a second data transmission device 212, and a third data transmission device 213. As the first data transmission device 211 transmits the sensed data 24 to the server 25, it will broadcast the message 28 to the second data transmission device 212 and the third data transmission device 213.

The second data transmission device 212 and the third data transmission device 213 do not transmit the same sensed data 24 or similar to the server 25 after they received the message 28 from the first data transmission device 211, such that there is, at the same time, only one data transmission device 21 (first data transmission device 211) in the same sensing region 22 to transmit the sensed data 24 to the server 25 at a time. Furthermore, the server 25 only receives one sensed data 24 at a time, and does not have the need to select one sensed data 24 from a plurality sensed data 24.

The data transmission device 21 can be a stationary device or a portable device, such as a mobile phone, PDA, notebook, and so on. In addition, the data transmission device 21 and the sensor device 23 can also be integrated into a data sensing transmission device 27.

Figure 3:
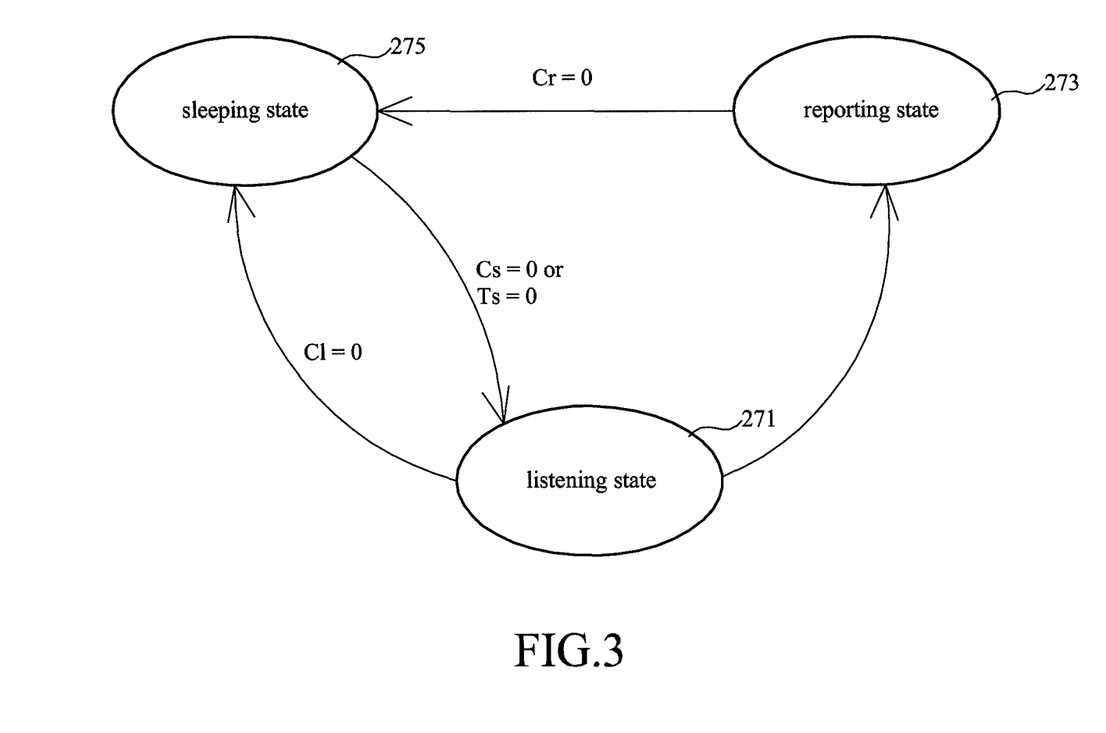
FIG. 3 is a schematic diagram of the reporting method for the data transmission device according to an embodiment of the present invention.

Referring to FIG. 3, a schematic diagram of the reporting method for the data transmission device according to an embodiment of the present invention is disclosed. Please, refer to FIG. 2 at the same time. The data transmission system 20 comprises a plurality of data transmission devices 21, and at least one sensor device 23. Moreover, the data transmission device 21 and the sensor devices 23 are located in the sensing region 22, and the data transmission device 21 can receive the sensed data 24 from at least one sensor device 23 and transmit the sensed data 24 to a server 25.

The data transmission devices 21 in the sensing region 22 can enter a listening state 271, a reporting state 273, or a sleeping state 275. The data transmission device 21 when at the listening state 271 can receive the sensed data 24 from the sensor device 23 within the transmission region 26, and, furthermore, the data transmission device 21 can also receive the message 28 from other data transmission devices 21 in the same sensing region 22. For example, the first data transmission device 211 can receive the message 28 from the second data transmission device 212 or the third data transmission device 213.

The data transmission device 21 enters the reporting state 273 from the listening state 271 for transmitting the sensed data 24 to the server 25. Moreover, the data transmission device 21 when at the reporting state 273 also broadcasts the message 28 to other data transmission devices 21 in the same sensing region 22, while it transmits the sensed data 24 to the server 25.

The data transmission device 21 can enter the sleeping state 275 from the listening state 271 or the reporting state 273. The data transmission device 21 at the sleeping state 275 cannot receive the sensed data 24 from the sensor device 23 or the message 28 from other data transmission devices 21. Furthermore, the data transmission device 21 at the sleeping state 275 also cannot transmit the sensed data 24 to the server 25 or broadcast the message 28 to other data transmission devices 21.

The state of the data transmission device 21 can be changed among the listening state 271, the reporting state 273, and the sleeping state 275. As the data transmission device 21 at the listening state 271 receives the sensed data 24 from the sensor device 23 and does not receive the message 28 from other data transmission devices 21, it will enter the reporting state 273 from the listening state 271 after a first time slot T1 and a random time slot Tr for transmitting the sensed data 24 and broadcasting the message 28. Moreover, the data transmission device 21 at the reporting state 273 can receive the sensed data 24 from the sensor device 23 continuously, and the data transmission device 21 will keep transmitting the sensed data 24 to the server 25.

The data transmission device 21 can enter the sleeping state 275 from the reporting state 273, after it has completed the transmission of the sensed data 24 one time or several times. For example, as the data transmission device 21 enters the reporting state 273, a reporting counter Cr can be initialized to count the times of transmission of the sensed data 24. When the reporting counter Cr is equal to zero, the data transmission device 21 enters the sleeping state 275 from the reporting state 273.

Moreover, the data transmission device 21 can also enter the sleeping state 275 from the listening state 271. For example, as the data transmission device 21 enters the listening state 271, a listening counter Cl can be initialized to count the times of receiving the sensed data 24 or the message 28. When the listening counter Cl is equal to zero, the data transmission device 21 enters the sleeping state 275 from the listening state 271.

In addition, the data transmission device 21 can enter the listening state 271 from the sleeping state 275. For example, as the data transmission device 21 enters the sleeping state 275, a sleeping counter Cs can be initialized to count. When the sleeping counter Cs is equal to zero, the data transmission device 21 enters the listening state 271 from the sleeping state 275.

In another embodiment of the invention, the reporting counter Cr, the listening counter Cl, and the sleeping counter Cs can be a timer, and the data transmission device 21 can also enter the listening state 271 from the sleeping state 275 after a sleeping time slot Ts, predetermined period of time.

Figure 4:
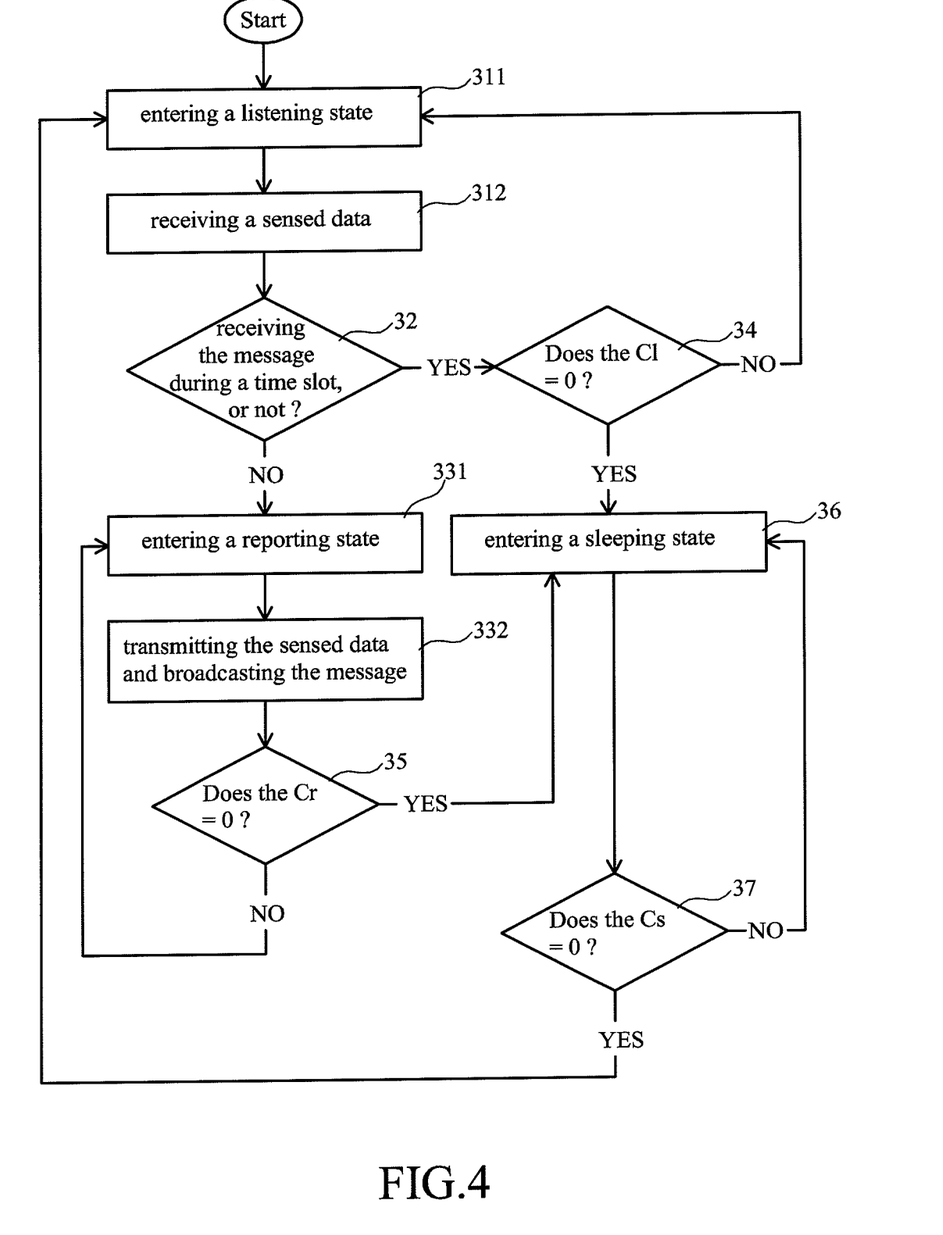
FIG. 4 is a flowchart of the reporting method for said data transmission device according to an embodiment of the present invention.

Referring to FIG. 4, a flowchart of the reporting method for the data transmission device according to an embodiment of the present invention is disclosed. Please, refer to FIG. 2 and FIG. 3 at the same time. There is a plurality of data transmission devices 21, and a plurality of sensor devices 23 in the same region 22, and the state of the data transmission device 21 can be changed among the listening state 271, the reporting state 273, and the sleeping state 275.

In one embodiment of the invention, the data transmission device 21, in the sensing region 22, enters the listening state 271, as shown in step 311. The data transmission device 21, at the listening state 271, receives the sensed data 24 from the sensor device 23, as shown in step 312.

Moreover, the data transmission device 21, at the listening state 271, can also receive the message 28 from other data transmission device(s) 21 in the same sensing region 22. The data transmission device 21 enters the reporting state 273 or the sleeping state 275 after determining whether it received the message 28 during a time slot or not, as shown in step 32. If the data transmission device 21 does not receive the message during the time slot, such as the first time slot T1 and the random time slot Tr, it will enter the reporting state 273, as shown in step 331. Thereafter, the data transmission device 21 can transmit the sensed data 24 to the server 25, and broadcast the message 28 to all other data transmission devices 21 in the sensing region 22, as shown in step 332.

In addition, as the data transmission device 21 enters the reporting state 273, the reporting counter Cr can be initialized to count the times of transmitting the sensed data 24. Furthermore, the data transmission device 21 can determine whether the reporting counter Cr is equal to zero or not, as shown in step 35. If the reporting counter Cr is equal to zero, the data transmission device 21 enters the sleeping state 36, as shown in step 36. If the reporting counter Cr is not equal to zero, the data transmission device 21 remains at the listening state 271, as shown in step 331.

Furthermore, if the data transmission device 21 receives the message 28 during a time slot, such as the first time slot T1 and the random time slot Tr, it will determine whether the listening counter Cl is equal to zero or not, as shown in step 34. If the listening counter Cl is equal to zero, the data transmission device 21 enters the sleeping state 275, as shown in step 36. If the listening counter Cl is not equal to zero, the data transmission device 21 remains at the listening state 271, as shown in step 311.

As the data transmission device 21 enters the sleeping state 36, the sleeping counter Cs can be initialized, and the data transmission device 21 can determine whether the sleeping counter Cs is equal to zero or not, as shown in step 37. If the sleeping counter Cs is equal to zero, the data transmission device 21 enters the listening state 271, as shown in step 311. If the sleeping counter Cs is not equal to zero, the data transmission device 21 remains at the sleeping state 275, as shown in step 36.

Figure 5:
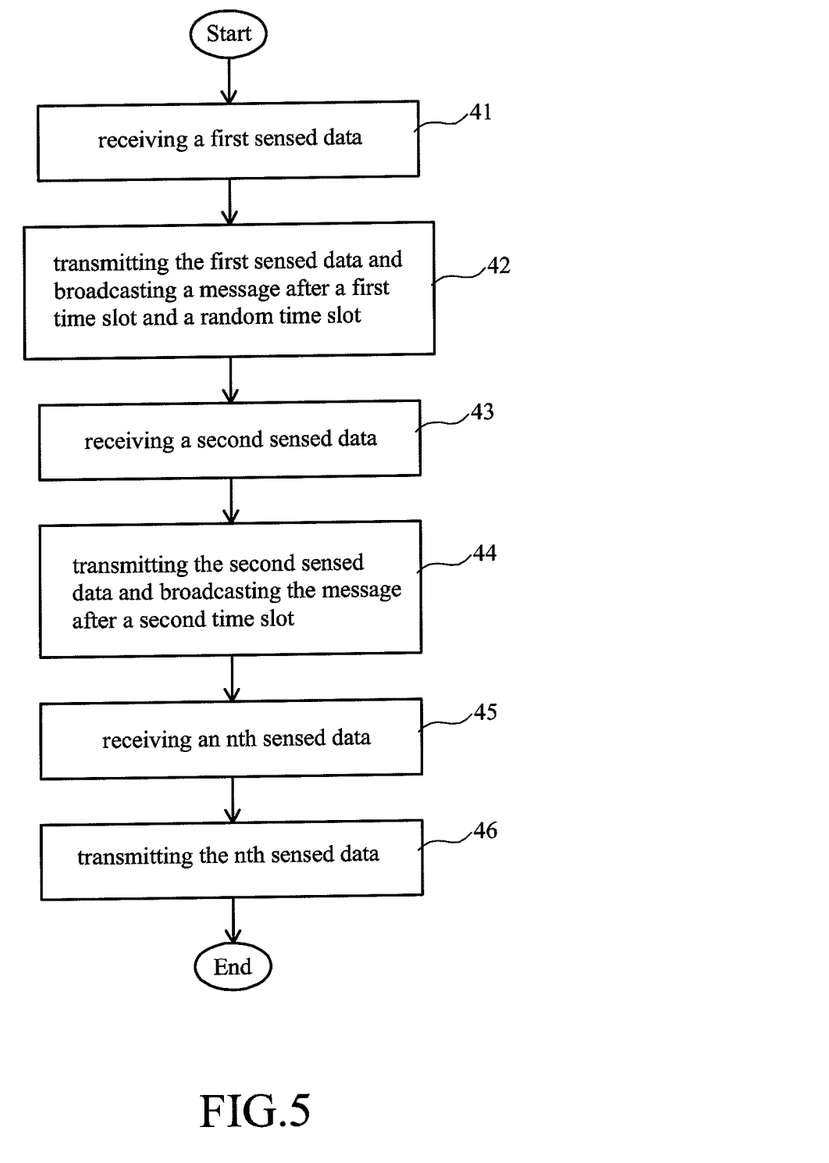
FIG. 5 is a flowchart of the reporting method for said data transmission device according to an embodiment of the present invention.

Referring to FIG. 5, a flowchart of the reporting method for the data transmission device according to an embodiment of the present invention is disclosed. Please, refer to FIG. 2, FIG. 3, and FIG. 4 at the same time. The data transmission system 20 comprises a plurality of data transmission devices 21, and the state of the data transmission devices 21 in the sensing region 22 can be changed among the listening state 271, the reporting state 273, and the sleeping state 275.

The data transmission device 21 enters the listening state 271 for receiving a first sensed data 241 from the sensor device 23, as shown in step 41. As the data transmission device 21 does not receive the message 28 from any of the other data transmission devices 21 in the sensing region 22 during the first time slot T1 and the random time slot Tr after receiving the sensed data 24 from the sensor device 23, the data transmission device will transmit the first sensed data 241 to the server 25 and broadcast the message 28, as shown in step 42. The data transmission device 21 receives a second sensed data 243 from the sensor device 24, as shown in step 43. Thereafter, the data transmission device 21 transmits the second sensed data 243 to the server 25 and broadcasts the message 28 after a second time slot T2, as shown in step 44.

The data transmission device 21 receives an nth sensed data 249 from the sensor device 24, wherein the nth sensed data 249 is the last sensed data 24 of this time reporting state 273, as shown in step 45. Thereafter, the data transmission device 21 transmits the nth sensed data 249 to the server 25 after an nth time slot Tn, wherein the reporting counter Cr is equal to zero after transmitting the nth sensed data 249, and the data transmission device 21 does not broadcast the message 28 while transmitting the nth sensed data 249, as shown in step 46. Furthermore, the data transmission device 21 enters a sleeping state 275 after transmitting the nth sensed data 249.

Since the data transmission device 21 does not broadcast the message 28 while transmitting the nth sensed data 249, other data transmission device(s) 21 can transmit the sensed data 24 after the first time slot T1 and the random time slot Tr. For example, there are a first data transmission device 211, a second data transmission device 212, and a third data transmission device 213 in the sensing region 22. As the first data transmission device 211 transmits the first sensed data 241 and the second sensed data 243, the second data transmission device 212 and the third data transmission device 213 will not transmit the sensed data 21 because of their receiving the message 28. However, the data transmission device 21 does not broadcast the message 28 while transmitting the nth sensed data 249, so the second data transmission device 212 or the third data transmission device 213 will transmit the sensed data 21 to the server 25 after the first time slot T1 and the random time slot Tr.

The first time slot T1, the second time slot T2, and the nth time slot Tn can be the same, such that the sensed data 24 of the sensing region 22 can be transmitted from one of the data transmission devices 21 to the server 25 about the first time slot T1, and the server 25 can obtain the information of the sensing region 22 continuously.

Figure 6:
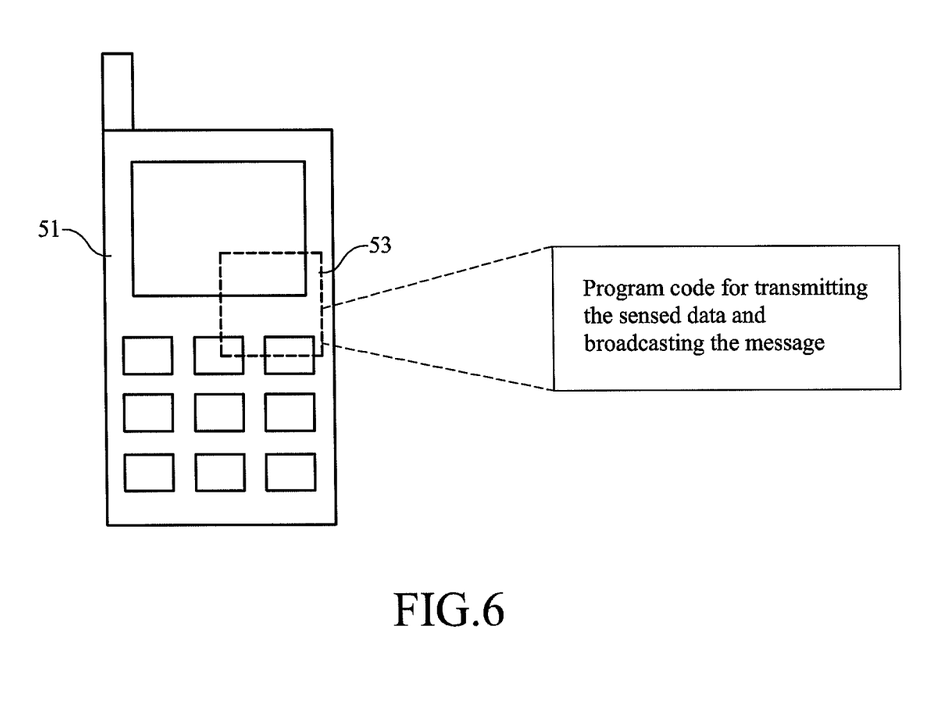
FIG. 6 is a schematic diagram of a storage medium storing a computer program for execution of a reporting method according to an embodiment of the present invention.

Referring to FIG. 6, a schematic diagram of a computer-readable medium 53 inside a data transmission device 51, such as a storage medium, storing a computer program for execution of a reporting method according to an embodiment of the present invention is disclosed. The computer-readable medium having stored thereon a set of instructions to translate instructions, the set of instructions, which when executed by a processor, cause the processor to perform a method comprising the steps of: receiving a first sensed data; transmitting the first sensed data and broadcasting a message after a first time slot and a random time slot; receiving a second sensed data; transmitting the second sensed data and broadcasting the message after a second time slot; receiving an nth sensed data; and transmitting the nth sensed data after an nth time slot.

Transmitting methods and systems, or certain aspects or portions thereof, may take the form of program code (i.e., executable instructions) embodied in tangible media, such as flash memories, RAMs, floppy diskettes, CD-ROMS, hard drives, or any other machine-readable storage medium, wherein, when the program code is loaded into and executed by a machine, such as a computer or a device comprising a mobile phone, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer or a device comprising a mobile phone, the machine becomes an apparatus for practicing the disclosed methods. When implemented on a general-purpose processor, the program code combines with the processor to provide a unique apparatus that operates analogously to application specific logic circuits.

Figure 7:
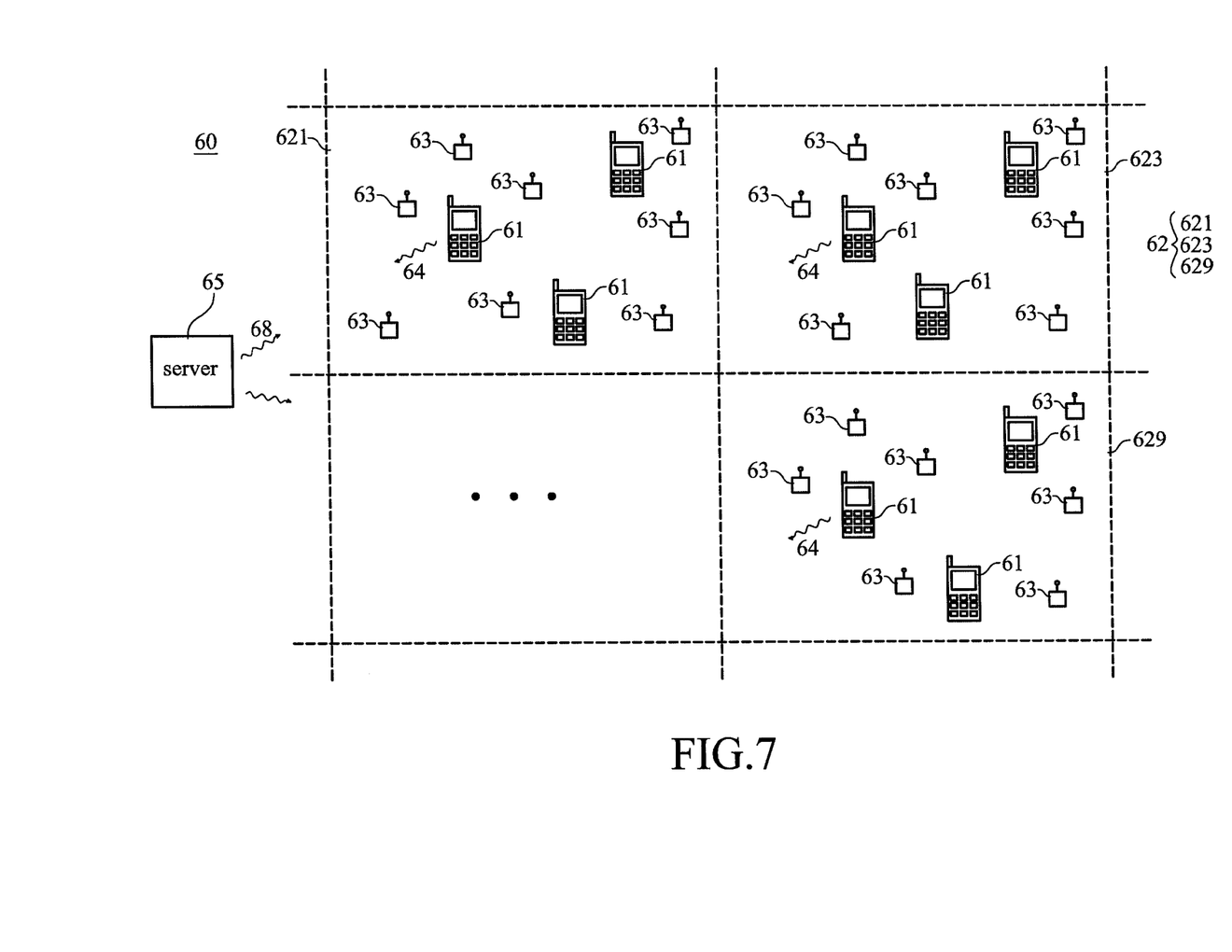
FIG. 7 is a schematic diagram of the sensed data transmission system according to another embodiment of the present invention.

Referring to FIG. 7, a schematic diagram of the sensed data transmission system according to another embodiment of the present invention is disclosed. The data transmission system 60 comprises a server 65, at least one sensing region 62, at least one data transmission device 61 and at least one sensor device 63, wherein the data transmission device 61 and the sensor device 63 are located in the sensing region 62. The sensor device 63 can be used to monitor the present environmental information of the sensing region 62 for generating a sensed data 64. Furthermore, the data transmission device 61 can receive the sensed data 64 from the sensor device 63.

The server 65 is able to receive the sensed data 64 from at least one data transmission device 61 within the same or different the sensing region 62. In one embodiment of the invention, the data transmission system 60 comprises a plurality of sensing regions 62, such as the first sensing region 621, the second sensing region 623, . . . , and the nth sensing region 629, and the server 65 broadcasts different messages 68 to each sensing region 62 according to the analysis of sensing data 64 transmitted from different sensing regions 62.

Moreover, in one embodiment of the invention, the state of the data transmission device 61 comprises a sleeping state and an active state. The data transmission devices 61 within each sensing region 62 adjust the sleeping timer Ts or state according to the receiving message 68. The sleeping timer Ts is used to decide the time period during which the data transmission device stays in the sleeping state. The active state comprises the reporting state 273 and the listening state 271 as shown in FIG. 3. Thereafter, it is not necessary to broadcast message 28 from the data transmission device 61 to each other within the same sensing region 62, and the general data transmission device 61, such as mobile phone, notebook and smart phone, can be applied to the data transmission system 60.

In one embodiment of the invention, the sensed data 64 also comprises the coordinates of the data transmission device 61, such that the server 65 is able to know the data transmission device 61 that transmits the sensing data 64 is located within which sensing region 62.

Figure 8:
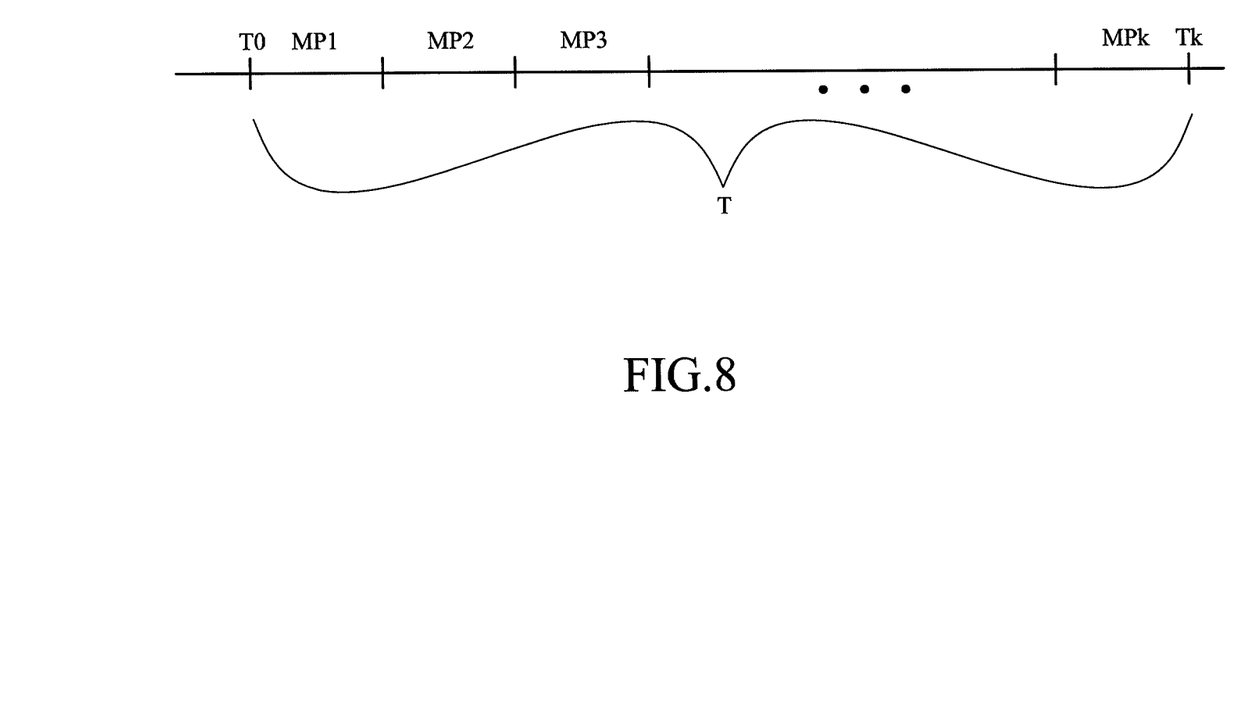
FIG. 8 is a schematic of the timeline divided into a plurality of monitoring periods.

Referring to FIG. 8, the server 65 divides the timeline T into a plurality of monitoring periods MPs, wherein the number of monitoring periods MPs is k, such as the first monitoring period MP1, the second monitoring period MP2, . . . , and the kth monitoring period MPk. Moreover, the server 65 is able to know whether or not the data transmission device 61 has transmitted the sensing data 64 during each monitoring period MP.

In one embodiment of the invention, the server 65 is able to define the range of the timeline T, and divides timeline T into a plurality of monitoring periods MPs. For example, the server 65 divides timeline T that starts at the time T0 and ends at the time Tk, during which there are k monitoring periods MPs. Furthermore, the server 65 counts the number of monitoring periods MPs that have received the sensing data 64 from a particular sensing region 62, and then calculates the ratio of the number of monitoring periods MP that have received the sensing data 24 from the particular sensing region 62 to the number of all monitoring periods MPs.

In another embodiment of the invention, the server 65 counts the number of monitoring periods MPs that haven't received the sensing data 64 from a particular sensing region 62, and then calculates the ratio of the number of monitoring periods MP that haven't received the sensing data 24 from a particular sensing region 62 to the number of all monitoring periods MP. For example, the number of all monitoring periods MPs is k, the number of monitoring periods MPs without receiving the sensing data 24 from a particular sensing region 62 is n, and the ratio of the number of monitoring periods MP without receiving the sensing data 24 from the particular sensing region 62 to the number of all monitoring periods MP is $\Gamma$, wherein the ratio $\Gamma = n/k$.

The server 65 broadcasts message 68 to data transmission devices 61 within the same sensing region 62, such as the first sensing region 621, according to the ratio $\Gamma$. In one embodiment of the invention, the server 65 presets a threshold $\rho$ to compare with the ratio $\Gamma$. As the ratio $\Gamma$ is 0, the server 65 broadcasts a first message to data transmission devices 61 to increase the sleeping timer Ts of data transmission devices 61 within the same sensing region 62. As the ration $\Gamma$ is smaller than the threshold $\rho$, the server 65 broadcasts a second message to data transmission devices 61 to maintain the sleeping timer Ts of data transmission devices 61 within the same sensing region 62. As the ration $\Gamma$ is larger than or equal to the threshold $\rho$, the server 65 broadcasts a third message to data transmission devices 61 to decrease the sleeping timer Ts of data transmission devices 61 within the same sensing region 62.

In a preferred embodiment of the invention, V(i) is the ith configuration for the sleeping timer Ts of data transmission devices 61 within a particular sensing region 62. As the ratio $\Gamma$ is 0 at the time Ti, the server 65 broadcasts a first message to data transmission devices 61 within the particular sensing region 62, and then data transmission devices 61 increase the sleeping timer V(i+1) to V(i)+A$\theta$, wherein A is an adjustable value and $\theta$ is the length of a monitoring period MP. As the ration $\Gamma$ is smaller than the threshold $\rho$, the server 65 broadcasts a second message to data transmission devices 61 within the particular sensing region 62 to maintain V(i+1) of data transmission devices 61. As the ration $\Gamma$ is larger than or equal to the threshold $\rho$, the server 65 broadcasts a third message to data transmission devices 61 within the particular sensing region 62, and then data transmission devices 61 decrease V(i+1) to max{V(i)−A$\theta$, $\theta$}, wherein the sleeping timer Ts should larger than $\theta$.

The above embodiments are only used to illustrate the present invention, and are not intended to limit the scope thereof. Many modifications of the above embodiments can be made without departing from the spirit of the present invention.

What is claimed is:

1. A data transmission adjustment system, comprising:
   a plurality of data transmission devices within a sensing region; and
   a server receiving a sensed data from at least one said data transmission device, wherein said server adapted to define a timeline, divide said timeline into a plurality of monitoring periods, calculate a ratio of the number of said monitoring periods that have received said sensing data from said data transmission device within said sensing region or not to the number of all said monitoring periods, and broadcast at least one message to said data transmission devices within said sensing region according to said ratio,
   wherein said server defines a threshold to compare with said ratio, and
   wherein said data transmission devices increase the sleeping timer thereof, as said ratio of the number of said monitoring periods without receiving said sensing data from said data transmission device within said sensing region to the number of all said monitoring periods is 0.

2. The data transmission adjustment system of claim 1, wherein said server defines a start time and an end time, and said timeline is between said start time and said end time.

3. The data transmission adjustment system of claim 1, wherein said data transmission devices adjust the sleeping timer thereof according to said message.

4. The data transmission adjustment system of claim 1, wherein said server broadcasts message to said data transmission devices according to said threshold and said ratio.

5. The data transmission adjustment system of claim 1, further comprising at least one sensor device within said sensing region to transmit said sensed data to said data transmission device.

6. A data transmission adjustment system, comprising:
a plurality of data transmission devices within a sensing region; and
a server receiving a sensed data from at least one said data transmission device, wherein said server adapted to define a timeline, divide said timeline into a plurality of monitoring periods, calculate a ratio of the number of said monitoring periods that have received said sensing data from said data transmission device within said sensing region or not to the number of all said monitoring periods, and broadcast at least one message to said data transmission devices within said sensing region according to said ratio,
wherein said server defines a threshold to compare with said ratio, and
wherein said data transmission devices maintain the sleeping timer thereof, as said ratio of the number of said monitoring periods without receiving said sensing data from said data transmission device within said sensing region to the number of all said monitoring periods is smaller than said threshold.

7. The data transmission adjustment system of claim 6, wherein said server defines a start time and an end time, and said timeline is between said start time and said end time.

8. The data transmission adjustment system of claim 6, wherein said data transmission devices adjust the sleeping timer thereof according to said message.

9. The data transmission adjustment system of claim 6, wherein said server broadcasts message to said data transmission devices according to said threshold and said ratio.

10. The data transmission adjustment system of claim 6, further comprising at least one sensor device within said sensing region to transmit said sensed data to said data transmission device.

11. A data transmission adjustment system, comprising:
a plurality of data transmission devices within a sensing region; and
a server receiving a sensed data from at least one said data transmission device, wherein said server adapted to define a timeline divide said timeline into a plurality of monitoring periods, calculate a ratio of the number of said monitoring periods that have received said sensing data from said data transmission device within said sensing region or not to the number of all said monitoring periods, and broadcast at least one message to said data transmission devices within said sensing region according to said ratio,
wherein said server defines a threshold to compare with said ratio, and
wherein said data transmission devices decrease the sleeping timer thereof, as said ratio of the number of said monitoring periods without receiving said sensing data from said data transmission device within said sensing region to the number of all said monitoring periods is larger than or equal to said threshold.

12. The data transmission adjustment system of claim 11, wherein said server defines a start time and an end time, and said timeline is between said start time and said end time.

13. The data transmission adjustment system of claim 11, wherein said data transmission devices adjust the sleeping timer thereof according to said message.

14. The data transmission adjustment system of claim 11, wherein said server broadcasts message to said data transmission devices according to said threshold and said ratio.

15. The data transmission adjustment system of claim 11, further comprising at least one sensor device within said sensing region to transmit said sensed data to said data transmission device.

16. A data transmission adjustment method for a server, wherein said server receives at least one sensing data from at least one data transmission device within a sensing region, said data transmission adjustment method comprising the steps of:
defining a timeline;
dividing said timeline into a plurality of monitoring periods;
calculating a ratio of the number of said monitoring periods that have received said sensing data from said data transmission device within said sensing region or not to the number of all said monitoring periods;
broadcasting at least one message to said data transmission devices within said sensing region according to said ratio,
defining a threshold;
comparing said threshold with said ratio; and
increasing the sleeping timer of said data transmission devices within said sensing region, wherein said ratio of the number of said monitoring periods without receiving said sensing data from said data transmission device within said sensing region to the number of all said monitoring periods is 0.

17. The data transmission adjustment method of claim 16, further comprising the step of: defining a start time and an end time, wherein said timeline is divided into k monitoring periods between said start time and said end time.

18. The data transmission adjustment method of claim 16, further comprising the step of: adjusting the sleeping timer of said data transmission devices according to said message.

19. The data transmission adjustment method of claim 16, wherein said server broadcasts message to said data transmission devices according to said threshold and said ratio.

20. A data transmission adjustment method for a server, wherein said server receives at least one sensing data from at least one data transmission device within a sensing region, said data transmission adjustment method comprising the steps of:
defining a timeline;
dividing said timeline into a plurality of monitoring periods;
calculating a ratio of the number of said monitoring periods that have received said sensing data from said data transmission device within said sensing region or not to the number of all said monitoring periods;
broadcasting at least one message to said data transmission devices within said sensing region according to said ratio,
defining a threshold;
comparing said threshold with said ratio; and
maintaining the sleeping timer of said data transmission devices within said sensing region, wherein said ratio of the number of said monitoring periods without receiving said sensing data from said data transmission device within said sensing region to the number of all said monitoring periods is smaller than said threshold.

21. The data transmission adjustment method of claim 20, further comprising the step of: defining a start time and an end time, wherein said timeline is divided into k monitoring periods between said start time and said end time.

22. The data transmission adjustment method of claim 20, further comprising the step of: adjusting the sleeping timer of said data transmission devices according to said message.

23. The data transmission adjustment method of claim 20, wherein said server broadcasts message to said data transmission devices according to said threshold and said ratio.

24. A data transmission adjustment method for a server, wherein said server receives at least one sensing data from at least one data transmission device within a sensing region, said data transmission adjustment method comprising the steps of:
- defining a timeline;
- dividing said timeline into a plurality of monitoring periods;
- calculating a ratio of the number of said monitoring periods that have received said sensing data from said data transmission device within said sensing region or not to the number of all said monitoring periods;
- broadcasting at least one message to said data transmission devices within said sensing region according to said ratio,
- defining a threshold;
- comparing said threshold with said ratio; and
- decreasing the sleeping timer of said data transmission devices within said sensing region, wherein said ratio of the number of said monitoring periods without receiving said sensing data from said data transmission device within said sensing region to the number of all said monitoring periods is larger than said threshold.

25. The data transmission adjustment method of claim 24, further comprising the step of: defining a start time and an end time, wherein said timeline is divided into k monitoring periods between said start time and said end time.

26. The data transmission adjustment method of claim 24, further comprising the step of: adjusting the sleeping timer of said data transmission devices according to said message.

27. The data transmission adjustment method of claim 24, wherein said server broadcasts message to said data transmission devices according to said threshold and said ratio.

* * * * *